Aug. 11, 1953   F. A. LOWER   2,648,358
MACHINE FOR CLEARING UNDERGROWTH FROM LAND
Filed Feb. 25, 1947   3 Sheets-Sheet 1
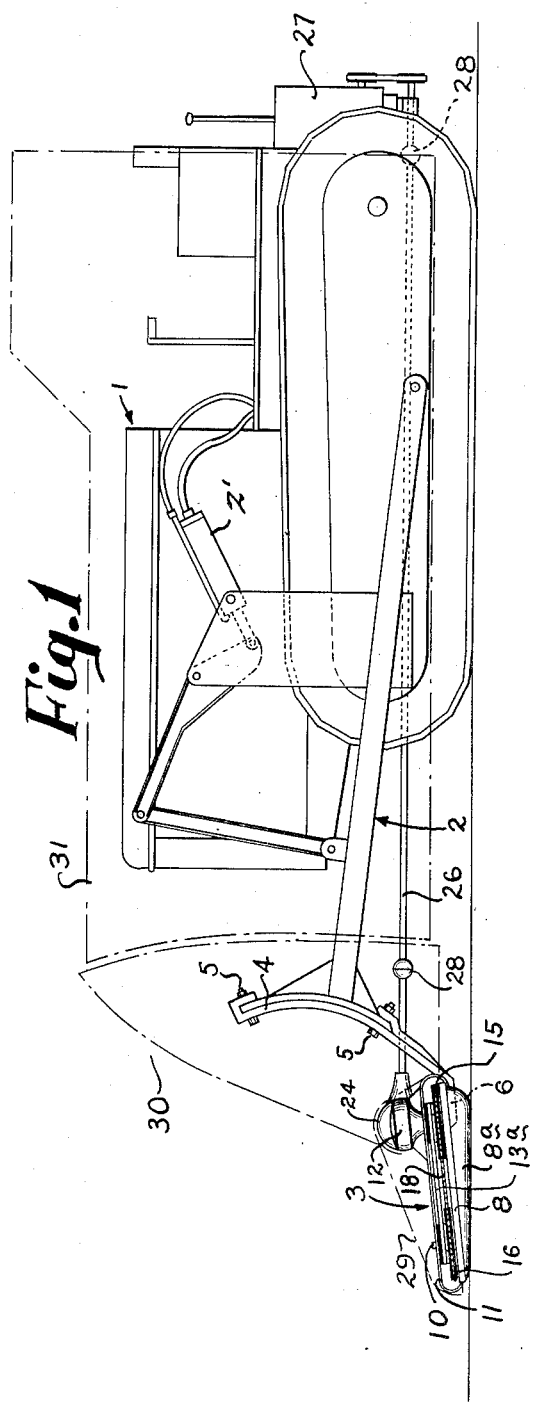
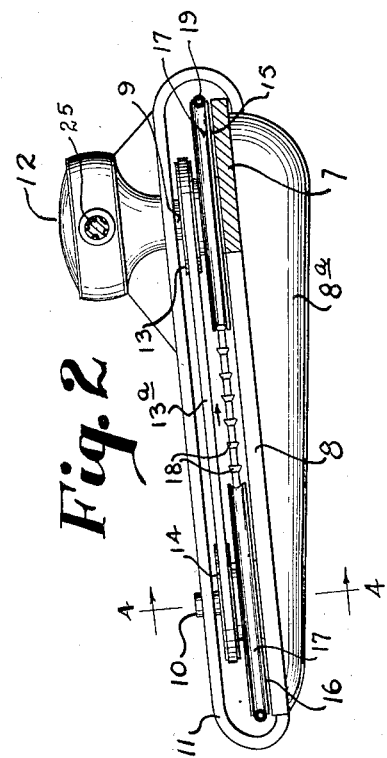
INVENTOR.
Fredrick A. Lower
BY
Wayland D Keith
HIS AGENT.

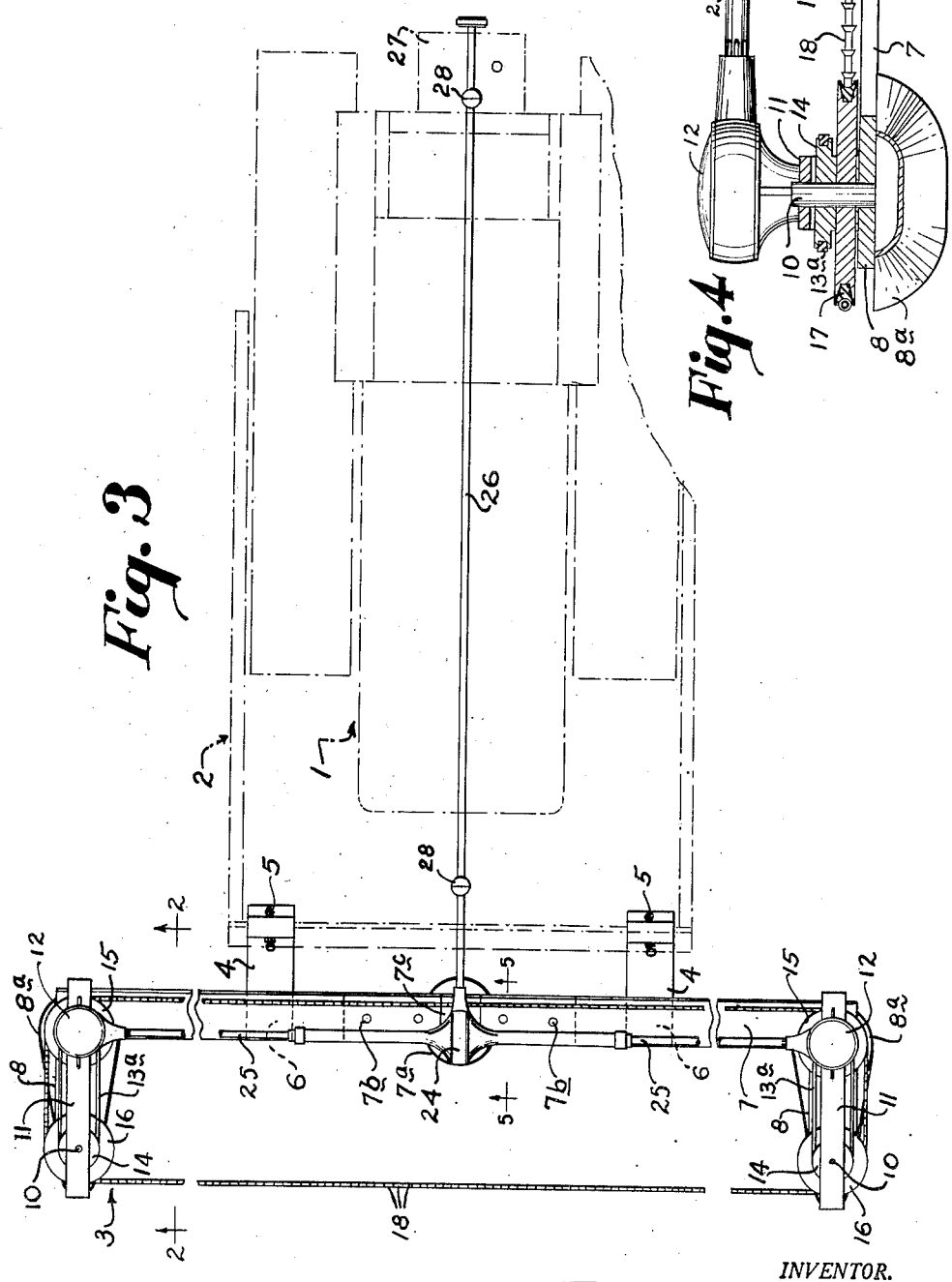

Aug. 11, 1953
F. A. LOWER
2,648,358
MACHINE FOR CLEARING UNDERGROWTH FROM LAND
Filed Feb. 25, 1947
3 Sheets-Sheet 3
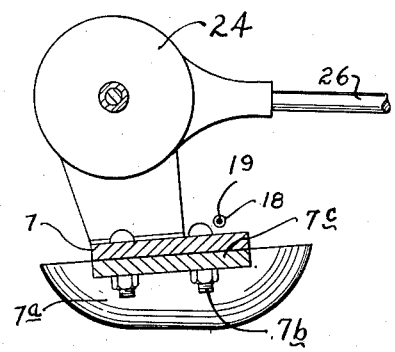
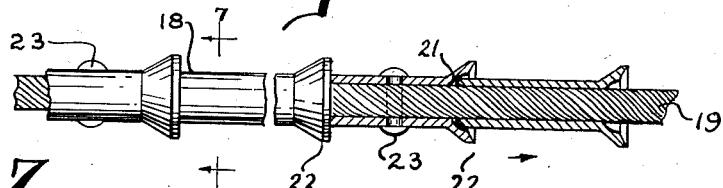
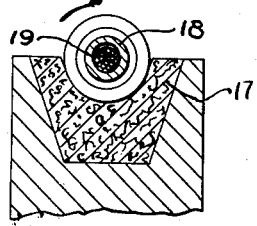
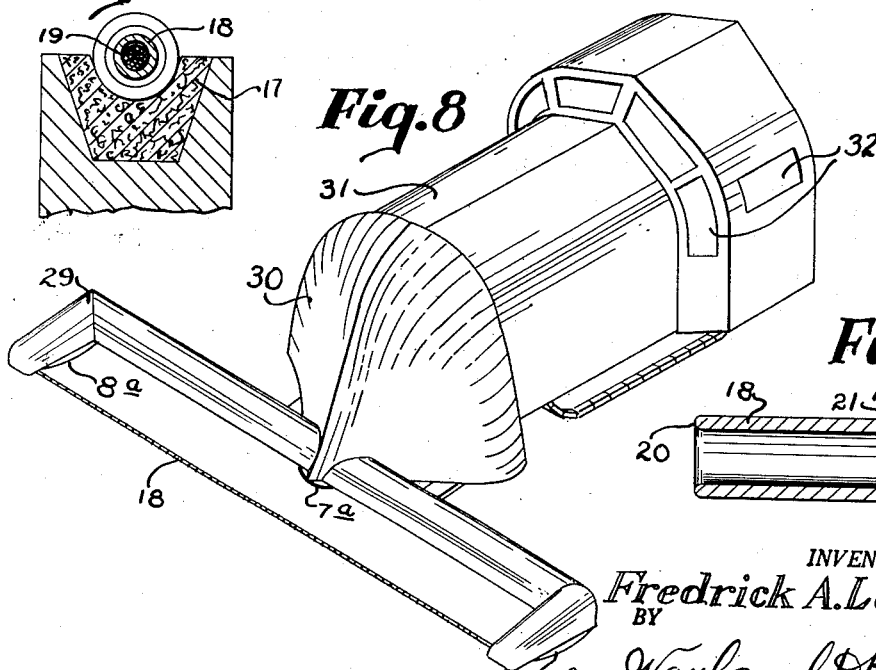
INVENTOR.
Fredrick A. Lower
BY Wayland D. Keith
HIS AGENT.

Patented Aug. 11, 1953

2,648,358

UNITED STATES PATENT OFFICE 2,648,358

MACHINE FOR CLEARING UNDERGROWTH FROM LAND

Fredrick A. Lower, Wichita Falls, Tex.

Application February 25, 1947, Serial No. 730,739

4 Claims. (Cl. 143—32)

This invention relates to improvements in machines for clearing undergrowth from land, and more particularly to an endless element having cutting elements disposed thereon and driven by a power device.

Various brush clearing devices have been proposed but these, for the most part, have disadvantages in that they must be in true alignment with the brush or trees being cut or they will not operate satisfactorily.

In the present invention, a multiplicity of tubular cutting elements which have a cutting edge disposed at one end around the outer periphery thereof have been provided. The cutting elements are disposed on an endless flexible cable element and are maintained in axially aligned relation. The cutting elements are retained against longitudinal movement on the cable by fastening elements passing through the cutting elements and through the cable at spaced intervals with the cutting elements positioned therebetween free to rotate on the cable.

The primary object of this invention is to provide a cutting element for trees, shrubs and underbrush, that will operate effectively in any direction without causing a binding or pinching of the cutting element while such cutting element is passing through the body of the tree or underbrush.

Another object of this invention is to provide a power operated cutting element which may be attached to and operated by a conventional bulldozer and which may be raised and lowered in accordance with the terrain over which it is operating.

A still further object is to provide a power driven cutting element for cutting trees and the like that is endless in character and in which the pulleys over which the cutting element passes are each individually driven so as to present a uniform pulling action by all of the pulleys on the endless cutting element.

With the foregoing objects in mind, reference is to be had to the accompanying drawings. In the drawings:

Fig. 1 is a side elevation of a crawler type tractor having a conventional bulldozer mounted thereon, showing the device as applied thereto, with a brush shield indicated in broken outline;

Fig. 2 is a section on line 2—2 of Fig. 3, looking in the direction indicated by arrows;

Fig. 3 is a top plan view of the device with parts broken away and shortened and with the tractor and bulldozer shown in dot-dash outline;

Fig. 4 is a sectional view taken on line 4—4 of Fig. 2;

Fig. 5 is a section taken on line 5—5 of Fig. 3, looking in the direction indicated by arrows;

Fig. 6 is a fragmentary view of cutting elements disposed upon the cable with parts broken away and shortened and with parts shown in elevation to show details of construction;

Fig. 7 is a section taken on line 7—7 of Fig. 6;

Fig. 8 is a perspective view of the device showing a shield installed thereon and over the tractor element; and Fig. 9 is an enlarged longitudinal sectional view through one of the cutting elements showing a spherical concave seat in one end thereof and a spherical convex seat on the opposite end thereof.

With more specific reference to the drawings, the numeral 1 generally designates a conventional traction element which is shown in the present invention as being of the crawler type and having a conventional bulldozer attachment generally designated by the numeral 2 mounted thereon. The bulldozer parallel arms 2 are pivotally mounted on each side of the traction element 1 and are adapted to be raised and lowered by a hydraulic power device 2' as shown in Fig. 1.

The tree cutting attachment is generally designated by the numeral 3 and is attached to the bulldozer blade or transverse member by straps 4 secured thereto by bolts 5. The straps 4 which are spaced apart laterally extend downwardly and are turned to project forwardly, as indicated at 6, to support a frame comprising a transverse bar 7, which transverse bar 7 is split in the center as indicated in Fig. 3 and has bolts 7b passing therethrough and through a connecting bar 7c so as to provide for longitudinal adjustment of said transverse bar. The bar 7 extends outward on either side of the tractor as indicated in Fig. 3 and has bars 8 rigidly secured thereto at right angles at the outer ends thereof forming a framework for supporting shafts 9 and 10. Bars 11 extend over and are attached to the bars 8 and spaced thereabove to form a framework, as indicated in Figs. 2 and 4, for supporting a right angle driving mechanism 12 thereon.

A skid member 7a (Figs. 5 and 8) having a substantially flat bottom with rounded sides forming somewhat a segment of a truncated sphere, is mounted below the bar 7 approximately midway between the ends thereof so as to support the bar 7 at the proper height above the ground when the bulldozer is in lower position. Disposed at either end below the bars 8 are skid members 8a which are similarly flat on the lower sides thereof and have rounded outer sides and ends so as to present a member adapted to be moved in all directions without digging into the earth. These skid members 8a support the outer ends of the transverse bar 7 the same height as the skid member 7a. By this arrangement the weight of the bulldozer blade and the cutting element mechanism disposed thereon are carried by said skid members and supported thereby for pushing along ahead of the tractor. By having the skid members so mounted, the tractor may be turned from side to side or backed without the skids or the mechanism digging into the ground.

The shafts 9 and 10 are journaled in the bars 8 and 11 and have pulleys 13 and 14, respectively, thereto fixedly secured. These pulleys are of the same diameter, as will hereinafter be more fully described. A second pair of pulleys 15 and 16 are fixedly secured to shafts 9 and 10 so that they will turn in unison with pulleys 13 and 14, respectively, when shafts 9 and 10 are rotated. The pulleys 15 and 16 preferably have V-shaped resilient outer facings 17, as illustrated in Figs. 4 and 7, which facings may be made of rubber, leather or other suitable material, so as to form a frictional relation with the endless cutting element formed by cutter elements 18 mounted on a flexible cable 19.

V-belts 13a, 13a surround the pulleys 13, 14 and 13, 14 at either end so that power transmitted through the shafts 9 to pulleys 13 and 15 will also be transmitted with equal speed and power to pulleys 14 and 16 mounted on the shaft 10 at each end of the framework. It will be appreciated that by exerting an equal drive on the pulleys 15, 15 and pulleys 16, 16 that the area of frictional contact with pulleys 15, 15 and 16, 16 will be 360 degrees and with resilient facings 17 on the pulleys 15, 15 and the pulleys 16, 16 a powerful driving action is accorded to the endless cutting element. By providing the resilient facing for the pulleys as above mentioned the cutter edges 22 of the cutter elements 18, which will hereinafter be described, will embed within such resilient material without injuring or dulling the edges thereof and this arrangement will serve also to increase the friction for driving the cutter elements.

The cable 19 is formed in an endless member in the manner well understood in the art of splicing cables and has tubular cutter elements 18 formed with a convex rounded end 20 adapted to seat in a concave spherical seat 21 in the cutter element adjacent thereto when positioned in end to end relation on the cable, as shown in Fig. 6. The inner bore of the tubular element 18 is chamfered or rounded at the end adjacent the convex rounded end 20, as shown in Fig. 9, to prevent pinching or shearing of cable 19. The tubular cutting element 18 has an outwardly flared end to form a cutter edge 22, and has an axial hole therethrough of a larger diameter than the cable so as to permit universal bending action between adjacent cutters and the clearance therebetween will permit a slight vibration to cause the shedding of the kerf or sawdust which is removed by the cutter. Normally, these cutter elements are strung on the cable 19 so that they will be freely rotatable thereon and have sufficient room so that these cutters may bend without causing undue strain or shearing action on the cable. At spaced intervals along the cable 19 rivets 23 pass through a cutter element 18 and through the cable to prevent longitudinal movement of the cutter elements relative to the cable 19. These rivets may be spaced apart any desired distance but it has been found that satisfactory results are obtained by spacing these at intervals of from two to three feet along the cable.

The endless element, formed by the cutter elements 18 mounted on the cable 19, is positioned around pulleys 15, 15 and 16, 16 so as to form a sawing element, as shown in Fig. 3, having a throat of a depth to accommodate the diameter of the largest tree to be cut. The distance between centers of the shafts 10, 10 may be up to or even exceed 20 feet and the lineal travel of the cable 19 carrying the cutter elements 18 may vary in accordance with the particular type of cutting to be done and the forward travel of the tractor 1.

The bevel gear elements 12, 12 are driven through a central bevel gear unit 24 which is mounted on transverse bar 7 and which drive unit has shafts 25, 25 extending laterally therefrom and which shafts, through proper driving engagement, rotate shafts 9, 9 in the same direction so as to rotate the cutter elements in the direction as indicated by arrows in Figs. 2 and 6. The shafts 25, 25 are splined and are in complementary engagement with spline connection in the bevel gear elements 12, 12 so as to maintain a driving connection therewith while admitting of longitudinal adjustment of bar 7.

A drive shaft 26 is driven by a power take-off mechanism 27 to the central bevel gear drive unit 24 and universal joints 28, 28 are provided within the length thereof to compensate for angularity of movement of said shaft. A splined connection (not shown) between the shaft and the universal joints may be provided to compensate for any relative lineal movement due to the raising or lowering of the bulldozer element 2.

It is preferable to have the framework comprising the transverse bar 7 and the end frame members comprising bars 8 and 11 and the bevel gear units 12, 12 covered by a shield 29 to prevent brush and trees from becoming entangled in the drive mechanism. The shield 29 is secured to the transverse bar 7 and end frame bar members 8 and 11 in spaced relation from the mechanism thereunder to permit the operation thereof. A front shield 30 is attached to the transverse bar member and to the framework of the bulldozer member 2, as will best be seen by dotted outline in Fig. 1, so that the shield members 29 and 30 will be raised and lowered upon the raising and lowering of the bulldozer member 2. Spaced rearward of shield 30 is a shield 31 which covers the tractor and is mounted thereon to protect the operator from falling trees and the like. It is preferable to have windows 32 provided in said shield, as shown in Fig. 8, so that the operator may guide the tractor and cutting element over the terrain which is being cleared.

In the operation of the device, the tractor 1 is moved forward and with the power take-off driving the drive shaft 26 the gears within the central bevel gear unit 24 are rotated, which gears, in turn, rotate shafts 25 extending laterally therefrom to bevel gear unit 12, 12 disposed on the frame member 11 near the outer ends of the transverse bar 7. The gears within the bevel gear units 12, 12 are so arranged as to rotate the vertical shafts 9, 9 passing therethrough in the same direction. Consequently, the pulleys 13, 13 and 15, 15 mounted thereon are rotated in unison in the same direction.

Pulleys 13, 13 drive pulleys 14, 14 through belts 13a, 13a in a one-to-one relation and with pulleys 13, 15 and 13, 15 fixedly secured to shafts 9—9 respectively, and pulleys 14, 16 and 14, 16 fixedly secured to shafts 10—10 respectively, a driving mechanism is set up that rotates pulleys 15, 15 and pulleys 16, 16 simultaneously at equal speed and in the same direction. With the cutter elements 18 mounted on the flexible cable 19 extending over the respective pulleys as aforementioned, the cutting elements will be drawn in the direction indicated by arrows in Figs. 2 and 6. With the tractor 1 advancing over the terrane and with the cutter element supported the desired distance above the ground by skid members 7a and 8a the cutter elements 18 will cut through the brush or trees without pinching or binding.

It is to be pointed out that the edge 22 of the cutter element 18 is flared to present a cutting edge, and the space intermediate the cutting edges 22 provides recesses for chips or cuttings which the cutter elements cut from the brush or trees. By having the cutter elements tubular in shape with a flared outer end presenting a cutting edge and with a majority of the cutter elements free to rotate upon the cable 19, the cutting through comparatively large trees and underbrush is very rapid, as the cutter elements are adapted to cut in any direction as long as the cable has longitudinal movement.

By having the shield 30 sloping upwardly and rearwardly and by having the shield 31, which is attached to and covers the tractor, with a ridged top provision is made to permit the shedding of the brush and trees to either side therefrom.

Having thus described my invention, I claim:

1. In an apparatus adapted to be attached to a traction element, a pair of forwardly extending arms pivotally attached to the rear of said traction element, a transverse member interconnecting the forward ends of said arms, a pair of upstanding bars having hooks on the upper end for detachably interengaging said transverse member, clamps for bindingly engaging said bars with said transverse member, a U-shaped frame secured to said bars and having spaced cantilever portions connected together at one end only thereof, a rubber faced pulley mounted on the free end of each of said cantilever portions, an endless flexible cutting device extending over the pulleys in bridging relation between the extremities of said cantilever portions for applying a cutting action to objects therebetween, and gear means for driving each of said pulleys independently of said endless flexible cutting device.

2. In an apparatus adapted to be attached to a traction element, a pair of forwardly extending arms pivotally attached to the rear of said traction element, a transverse member interconnecting the forward ends of said arms, a pair of upstanding bars having hooks on the upper end for detachably interengaging said transverse member, clamps for bindingly engaging said bars with said transverse member, a U-shaped frame secured to said bars and having spaced cantilever portions connected together at one end only thereof, a pulley mounted on the free end of each of said cantilever portions, an endless flexible cutting device extending over the pulleys in bridging relation between the extremities of said cantilever portions for applying a cutting action to objects therebetween, and power means for driving each of said pulleys so as to drive said flexible cutting device independently of any driving action by said flexible cutting device.

3. In a land clearing apparatus adapted to be mounted on a traction element, a frame having forwardly projecting arms, a pulley journaled at each outer end and each inner end of said arms, an endless flexible cutting element surrounding said pulleys and abridging the outer ends of said projecting arms, power means for driving said pulleys independently of said flexible cutter so each of said pulleys will drive said endless flexible cutting element, and means for raising and lowering said arms.

4. In a land clearing apparatus adapted to be mounted on a traction element, a frame having forwardly projecting arms, a resiliently faced pulley journaled at each outer and each inner end of each of said arms, an endless flexible cutting element surrounding said pulleys and abridging the outer ends of said projecting arms, power means for driving each of said pulleys independently of said endless flexible cutter so each of said pulleys will drive said endless flexible cutting element, and means for raising and lowering said arms.

FREDRICK A. LOWER.

References Cited in the file of this patent

UNITED STATES PATENTS

| Number | Name | Date |
|---|---|---|
| 641,129 | Luce et al. | Jan. 9, 1900 |
| 812,412 | Downs et al. | Feb. 13, 1906 |
| 834,320 | Pfund | Oct. 30, 1906 |
| 1,190,739 | Edwards | July 11, 1916 |
| 1,276,579 | Scott | Aug. 20, 1918 |
| 1,344,624 | Ellis | June 29, 1920 |
| 1,967,116 | Gerdetz | July 17, 1934 |
| 2,043,603 | Allward | June 9, 1936 |
| 2,251,378 | Simpson | Aug. 5, 1941 |
| 2,380,753 | Segerstad | July 31, 1945 |

FOREIGN PATENTS

| Number | Country | Date |
|---|---|---|
| 317,926 | Germany | Jan. 7, 1920 |
| 318,367 | Germany | Jan. 24, 1920 |
| 327,435 | Germany | Oct. 11, 1920 |
| 56,871 | Sweden | June 11, 1924 |